July 23, 1957　　　　L. E. MULLER　　　　2,799,902
SILENCING BAFFLE FOR DEFROSTER OUTLET
Filed July 2, 1953
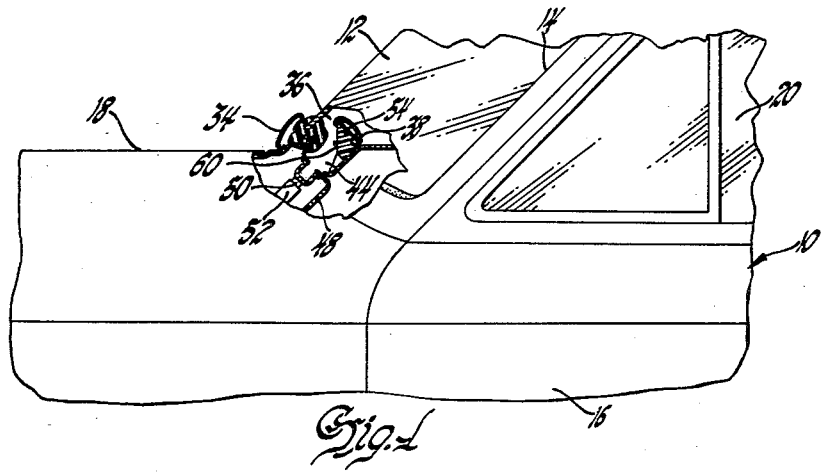
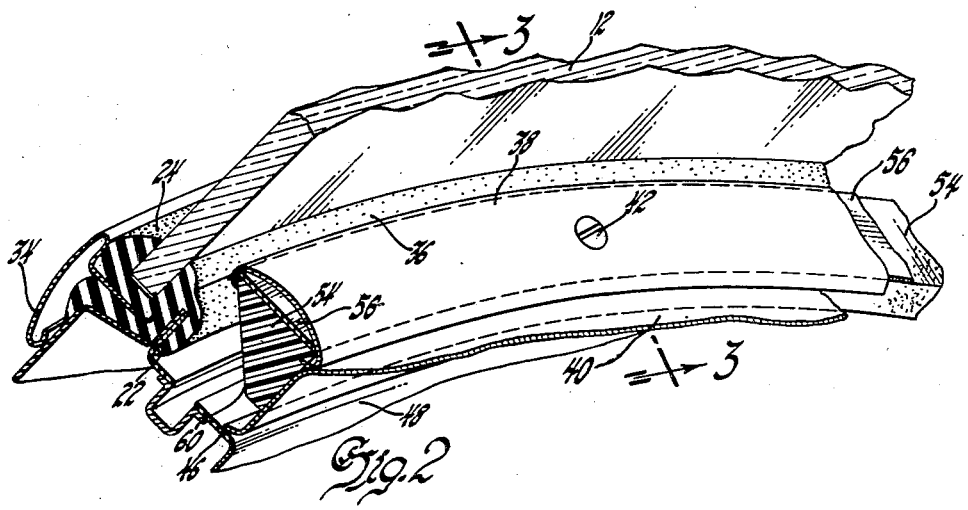
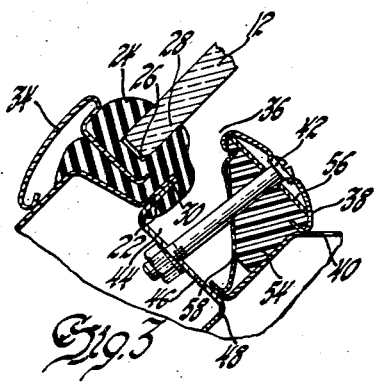
INVENTOR
Lloyd E. Muller
BY
ATTORNEY & nbsp;
2,799,902
SILENCING BAFFLE FOR DEFROSTER OUTLET Lloyd E. Muller, Flint, Mich., assignor to General Motors Corporation, Detroit, Mich., a corporation of Delaware Application July 2, 1953, Serial No. 365,610

1 Claim. (Cl. 20—40.5)

The present invention relates to ventilating means and more particularly to means for silencing the noises created by the discharge of air from vehicle window defrosters.

In the operation of automobiles and other vehicles, moisture, frost and other substances may condense on the windshield. To prevent the accumulation of such substances, ventilating means may be employed for directing a flow of air across the surface of the windshield. Accordingly, it is a common practice to provide a manifold adjacent the lower edge of the windshield with an upwardly directed outlet. However, when an adequate supply of air is discharged from the outlet, the resultant turbulence will create a large volume of objectionable noises.

It is therefore proposed to provide a dampening member for silencing the discharge of air from the defroster outlet. The dampening member preferably comprises an acoustical insulating material and is mounted in the defroster manifold adjacent the outlet thereof. The dampening member may have a fibrous surface disposed in the flow of air so that any objectionable vibrations in the air will be absorbed by the dampening member.

In the one sheet of drawings:

Fig. 1 is a fragmentary side elevation of a vehicle embodying the present invention, a portion thereof being broken away.

Fig. 2 is a perspective view of a portion of a defroster outlet embodying the present invention.

Fig. 3 is a cross sectional view taken substantially along the plane of line 3—3 of Fig. 2.

Referring to the drawings in more detail, the present invention may be embodied in an automotive vehicle 10 having a windshield 12 mounted in an opening 14 in the body 16. The windshield 12 is positioned immediately behind the engine hood 18 so as to enclose the front end of the passenger compartment 20. The windshield 12 may be supported on a pinchweld 22 that extends around the edge of the opening 14. In order to resiliently support the windshield 12 and seal the opening 14 from dirt and moisture, a resilient gasket 24 of some material such as rubber may be used. The gasket 24 may have one groove 26 that receives the edge 28 of the windshield 12 and another groove 30 that receives the pinchweld 22. If desired, a reveal molding 34 may be secured to the gasket 24 for decorative purposes.

In order to form an outlet 36 for the defroster, a member 38 may be disposed across the lower edge 28 of the windshield 12 in spaced relation thereto. This member 38 may be a portion of a decorative garnish molding that extends completely around the inside of the windshield 12. This portion may be secured to the top of the instrument panel 40 by a plurality of bolts 42. By spacing the molding 38 from the windshield 12, an elongated outlet 36 will be provided that will communicate with an elongated chamber or manifold 44 formed by the molding 38, the gasket 24 and a flange 46 on the top of the fire wall 48.

The outlet 36 preferably extends the entire length of the windshield 12 and is directed towards the surface thereof so that any air discharged from the manifold 44 will flow over the entire surface of the windshield 12.

Inlet means 50 adapted to receive an end of a distribution duct 52 may be provided in the flange 46 so as to communicate with the manifold 44. The opposite end of the duct 52 may be connected to a blower or other source of moving air such as a heater fan. Thus as the air is forced through the duct 52, it will flow through the inlet 50 into the manifold 44. After the air is blown into the manifold 44, it will be discharged through the outlet 36 across the surface of the windshield 12 so as to evaporate any material that may be condensed thereon.

The turbulences resulting from the movement of the air through the manifold 44 and outlet 36 will cause vibrations and noises that are objectionable to the occupants of the vehicle. Accordingly, a dampening member 54 may be mounted adjacent the outlet 36 to deaden these noises. In the present instance this comprises an elongated member 54 that is adapted to be positioned inside of the manifold 44 and to extend substantially the full length of the outlet 36. This member 54 is preferably an acoustical dampening material that has a large number of small dead air spaces. Fibrous materials such as glass wool have been found to be very effective for this use. In order to facilitate mounting the dampening member 54, a relatively stiff backing 56 may be provided on one side of the member 54. The back 56 preferably will fit inside of the molding 38 where it may be secured in position by any suitable means such as a plurality of spring clips 58. The dampening member 54 may have an inclined surface 60 thereon which is disposed adjacent the outlet 36. Thus as the air moves out of the manifold 44, it will travel across this surface 60 towards the outlet 36. In addition, the inlet 50 may be disposed so that as the air enters the manifold 44, it will impinge on the resilient surface 60 of the dampening member 54. Since the dampening member 54 comprises a large number of resilient fibers, the turbulence and resulting noises will be substantially less than when the air strikes the hard metallic surfaces that have been used heretofore. Also since the dampening member 54 comprises an acoustical dampening material having a large number of dead air spaces, as the air travels across the surface 60 of the dampening member 54, any noises that are developed will be trapped and absorbed in these spaces. It is therefore apparent that the amount of noise developed by the discharge of the air from the defroster outlet 36 will be materially reduced.

While the foregoing description and figures have been confined to one embodiment, it will be apparent to those skilled in the art that numerous modifications may be made without departing from the spirit thereof.. Accordingly, it is to be understood that the foregoing is to be considered as illustrative only and in no way restrictive, reference being had to the appended claim to determine the scope of the invention.

What is claimed is:

In a vehicle having a window therein, the combination of a mounting member for securing said window in position, said mounting member being secured to said vehicle and extending around at least a portion of the periphery of said window, a second member secured to said vehicle in substantially parallel spaced relation to said mounting member to form therewith an elongated chamber adjacent said window, a third member secured to said vehicle substantially perpendicular to said mounting member and said second member and having an edge spaced from said mounting member to define therewith an outlet for said chamber, a sound absorbent member secured to said third member within said chamber and abutting said second member and having an upwardly inclined surface extending from said second member to said edge to direct air against said window, and an inlet for said chamber disposed to direct air against the inclined surface of said sound absorbent member.

References Cited in the file of this patent

UNITED STATES PATENTS

| | | |
|---|---|---|
| 1,865,677 | Cheyney | July 5, 1932 |
| 2,001,878 | Johnson | May 21, 1935 |
| 2,239,508 | Sipp et al. | Apr. 22, 1941 |
| 2,644,389 | Dauphinee | July 7, 1953 |
| 2,718,037 | Lintern | Sept. 20, 1955 |